(No Model.) 2 Sheets—Sheet 2.
W. VOGT.
TRUCK AND GRIPPING MECHANISM FOR RAILWAY CARS.
No. 577,152. Patented Feb. 16, 1897.
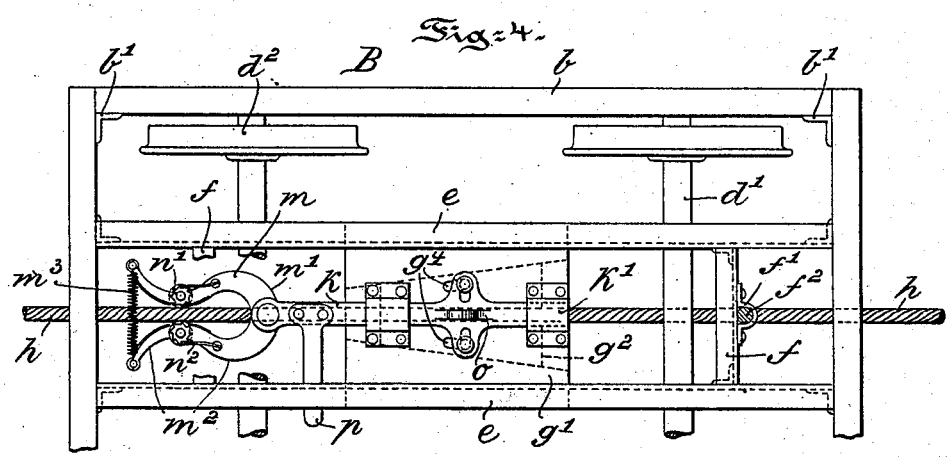
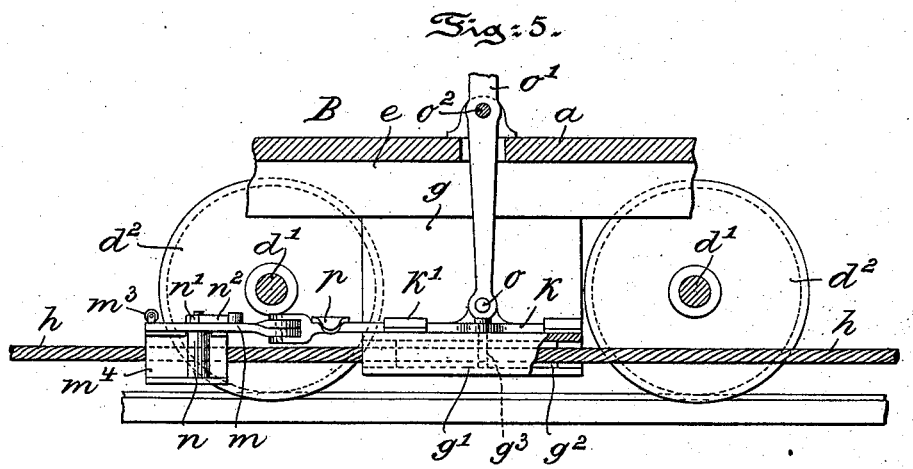
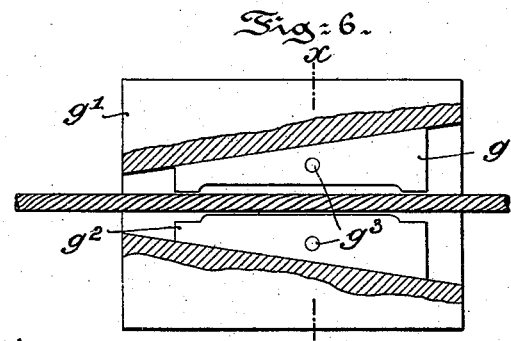
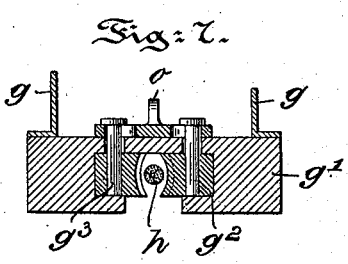
Witnesses:
Henry E. Everding.
Thomas M. Smith.
Inventor:
Wilhelm Vogt,
By J. Walter Douglass
Attorney.

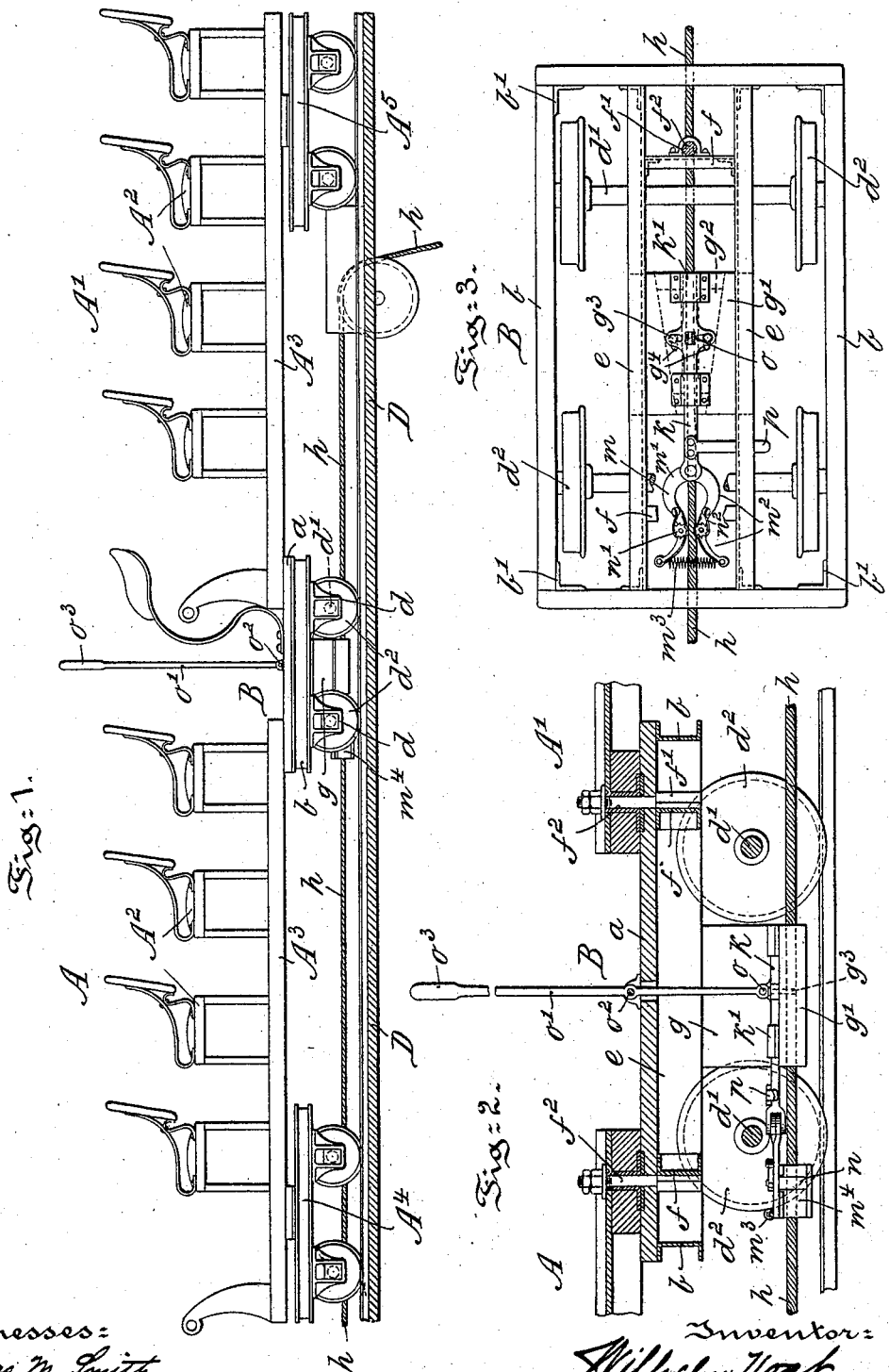

UNITED STATES PATENT OFFICE.

WILHELM VOGT, OF PHILADELPHIA, PENNSYLVANIA, ASSIGNOR TO ABRAHAM A. LANDIS, OF COLLEGEVILLE, PENNSYLVANIA.

TRUCK AND GRIPPING MECHANISM FOR RAILWAY-CARS.

SPECIFICATION forming part of Letters Patent No. 577,152, dated February 16, 1897.

Application filed March 5, 1896. Serial No. 581,880. (No model.)

*To all whom it may concern:*

Be it known that I, WILHELM VOGT, a subject of the Emperor of Germany, residing at the city of Philadelphia, in the county of Philadelphia and State of Pennsylvania, have invented certain new and useful Improvements in Trucks for Pleasure-Railway Cars and Gripping Mechanism Therefor, of which the following is a specification.

My invention has relation to a truck or similar supporting means for pleasure-railway cars and to gripping mechanism carried by said truck, whereby the cars may be automatically connected while in motion to a moving cable without jar, jolt, or shock; and in such connection it relates particularly to the construction and arrangement of such a truck and gripping mechanism.

The principal objects of my invention are, first, to provide in a pleasure-railway an auxiliary truck of simple construction to which adjacent ends of two cars are swiveled and upon which they are supported, said truck carrying a gripping mechanism, whereby both cars may be automatically connected while in motion with a moving cable, and, second, to provide an auxiliary truck consisting of a platform swiveled at either end to two adjacent cars, said platform supported upon an open framework carrying the wheels of the truck and the said framework being provided with longitudinal beams from which the gripping mechanism is suspended.

My invention, stated in general terms, consists of an auxiliary truck and gripping mechanism for pleasure-railway cars constructed and arranged in substantially the manner hereinafter described and claimed.

The nature and scope of my invention will be more fully understood from the following description, taken in connection with the accompanying drawings, forming part hereof, and in which—

Figure 1 is a side elevation of two cars of a pleasure-railway provided with an auxiliary truck at adjacent ends, said truck carrying an automatic grip mechanism embodying features of my invention. Fig. 2 is a central vertical section, enlarged, of the truck and grip mechanism. Fig. 3 is a top or plan view of the under side of the truck-frame and grip mechanism illustrated in Fig. 2. Fig. 4 is an enlarged view of Fig. 3, certain portions of the truck-frame being broken off. Fig. 5 is an enlarged view of a portion of Fig. 2. Fig. 6 is an enlarged underneath view of the gripping jaws or cheeks, and Fig. 7 is a cross-sectional view on the line $x\ x$ of Fig. 6.

Referring to the drawings, A and A' represent two cars of a pleasure-railway provided with the usual seats $A^2$ and flooring $A^3$. At the forward end of the car A the flooring is supported upon a swivel-truck $A^4$, and the rear end of the car A' is likewise supported upon a similar swivel-truck $A^5$. The adjacent ends of the two cars are supported upon a single auxiliary truck B in a manner hereinafter described.

The truck B consists of a platform or floor $a$, secured to and supported upon an open substantially square frame $b$, which in turn is supported upon boxes $d$, in which the axles $d'$ of the wheels $d^2$ revolve. The frame $b$ consists of four beams substantially semi-I-shaped in cross-section and united at the corners by means of angle-irons $b'$. The ends of the frame $b$ are connected by longitudinal beams $e$, from which, as hereinafter described, the gripping mechanism is suspended. The beams $e$ are connected together by the frame $b$ and also by two cross-beams $f$, each of which is provided with a vertically-perforated bracket $f'$, adapted to receive a king-bolt $f^2$, passing through the platform of each car and the platform of the truck, to thereby swivel each car to the truck. From the above description it will be understood that the auxiliary truck B is swiveled at either end to one end of adjacent cars A and A' and serves as a coupling and support for the said cars.

From the beams $e$ extends a downwardly-extending frame $g$, carrying a block $g'$, the under side of which is recessed, as indicated in dotted lines in Fig. 3, to form a guideway for two substantially wedge-shaped gripping-cheeks $g^2$, confined to the block $g'$ by means of the bolts $g^3$, having a range of movement in the converging slots $g^4$, extending through the block from the recess therein to the top thereof. The cheeks $g^2$ are provided with gripping-faces adapted when the cheeks are moved toward the converging end of the recess in the block $g'$ to grip the cable $h$. The cheeks are moved in the recessed block $g'$ by the following preferred mechanism: The bolts $g^3$, to which the cheeks are secured, are at their upper ends brought into slotted connection with a sliding bar $k$, having a range of longitudinal movement in suitable brackets $k'$ or their equivalents secured to the top of the block $g'$. The bar $k$ projects beyond the block $g'$ and is pivotally connected to two friction-jaws $m$. These jaws are curved, as at $m'$ and $m^2$, and terminate in flaring or divergent ends. The extreme ends of the jaws $m$ are connected together by a spring $m^3$. The curved portions of the jaws $m$ project downward in the form of wings $m^4$, corresponding in shape to the portions $m'$ and $m^2$, and are in alinement with the cable $h$, as indicated in Fig. 2. The jaws $m$ are provided with two vertically-disposed rollers $n$, rotating in suitable bearings formed by cutting out the wings $m^4$ to permit them to rest upon or against the cable $h$. These rollers $n$ are permitted to rotate in one direction only, and that being opposite to the direction in which the cars A and A' are moving. For this purpose each roller $n$ has at its upper end a ratchet $n'$, in which rests a pawl $n^2$. The bar $k$ is pivotally connected, as at $o$, with an upwardly-projecting lever $o'$, pivoted, as at $o^2$, in the platform $a$ of the truck B and provided with a handle $o^4$, by means of which the bar and the cheeks $g^2$ may be shifted by hand to connect or disconnect the cars from the cable $h$.

The gripping mechanism is operated automatically as follows: When the cars approach the point where the cable $h$ is to be taken, the friction-jaws $m$ will first come into frictional contact with the cable, and as the cars at that point are running faster than the cable the friction-jaws, bar, and gripping-cheeks will be pushed in a direction opposite to that in which the car is running, thus opening the gripping-cheeks and preventing the taking of the cable. As the speed of the car decreases, this friction of the cable $h$ against the jaws $m$ will lessen until finally when the speed of the car is the same, or approximately so, the friction-jaws will remain stationary or be drawn back to their original position with the cheeks $g^2$ clamped to the cable, and the cars taken by the cable without appreciable resistance or jar. Upon the rod $k$ is secured a cross-arm $p$, projecting at right angles to the rod and arranged in the path of a suitable projection (not shown) extending upward from the floor D of the track at the point where the cable is to be cast off. The projection when it strikes the arm $p$ will shift the bar $k$ in a direction opposite to that in which the cars are moving, and will thereby open the gripping-cheeks and release the cars from the cable.

I do not claim, broadly or generically, in the present application the gripping mechanism above described, inasmuch as the same forms the subject-matter of an application for a patent filed by me concurrently with the present application and serially numbered 581,879.

Having thus described the nature and objects of my invention, what I claim as new, and desire to secure by Letters Patent, is—

1. In a pleasure-railway, an auxiliary truck, comprising a platform swiveled at either end to adjacent cars, an open frame supporting the platform and provided with wheels, a frame depending from the open frame, and a gripping mechanism, consisting of two substantially wedge-shaped gripping-cheeks having a range of movement longitudinally on said depending frame, a sliding bar adapted to open and close said cheeks, spring-controlled friction-jaws secured to one end of said bar, and provided with wings adapted to rest on the cable, all arranged so that the friction-jaws will operate the cheeks of the gripping mechanism only when the speed of the car and the cable are approximately equal, substantially as and for the purposes described.

2. In a pleasure-railway, an auxiliary truck comprising a platform swiveled at either end to adjacent cars, an open frame supporting the platform and provided with wheels, a frame depending from the open frame, and a gripping mechanism, consisting of two substantially wedge-shaped gripping-cheeks having a range of movement longitudinally on said depending frame, a sliding bar adapted to open and close said cheeks, spring-controlled friction-jaws secured to one end of said bar, and provided with wings adapted to rest on the cable, all arranged so that the friction-jaws will operate the cheeks of the gripping mechanism only when the speed of the car and the cable are approximately equal, an upwardly-projecting lever pivoted at one end to the sliding bar and in the platform, said lever having a handle projecting above the platform, whereby the gripping-cheeks may be operated by hand, substantially as and for the purposes described.

In testimony whereof I have hereunto set my signature in the presence of two subscribing witnesses.

WILHELM VOGT.

Witnesses:
J. WALTER DOUGLASS,
THOMAS M. SMITH.